United States Patent Office 3,253,026
Patented May 24, 1966

3,253,026
RESOLUTION OF AMINO ACID SALTS
Marvin B. Gillis, Glenview, Ill., assignor to International Minerals & Chemical Corporation, a corporation of New York
No Drawing. Filed July 5, 1963, Ser. No. 293,136
4 Claims. (Cl. 260—534)

The present application is a continuation-in-part of application Serial No. 625,602, filed December 3, 1956, now abandoned, and copending application Serial No. 764,763 filed October 2, 1958, now abandoned.

This invention relates to the resolution of mixed glutamic acid enantiomorphs, and more particularly to the resolution of a mixture of monoammonium D- and L-glutamates.

Glutamic acid is principally valuable in the form of its L-isomer or salts thereof, which are readily obtained in substantially pure form from naturally occurring sources. A number of synthetic routes for preparing glutamic acid have been devised, but these have not been commercially attractive, a primary reason being that all such synthetic methods produce a racemic mixture of D- and L-glutamic acid, and no satisfactory method has heretofore been available for economically separating the L-isomer therefrom. The present invention affords such a method.

A primary object of the present invention is to separate the enantiomorphic forms of glutamic acid from a mixture thereof while minimizing or avoiding contamination of one enantiomorph with the other.

Another object is to effect the resolution of a mixture of monoammonium salts of D- and L-glutamic acid.

Other objects of the invention will be apparent from the present description and the appended claims.

It has now been discovered that an optically active form of monoammonium glutamate can be selectively crystallized from a supersaturated aqueous solution of monoammonium D- and L-glutamates by seeding the solution with crystals of the desired isomer at a temperature between about 15 and about 35° C. and a pH above about 6 and allowing crystallization to proceed. By a proper choice of operating conditions within these ranges, and by terminating the crystallization after a limited period of time, preferably not later than the time at which maximum resolution occurs, a crop of crystals can be obtained which is substantially uncontaminated with the non-seeded isomer.

It has further been discovered that the maximum attainable degree of resolution is markedly improved by incorporating an excess of ammonia in the supersaturated solution—i.e., so that the total molar ratio of ammonia to glutamic acid is greater than 1:1, the ammonia being present in an excess preferably between about 2.5 and about 10 mole percent, corresponding to a pH range of about 7 to about 8.5 at the levels of temperature and concentration employed in the process. The mechanism whereby this effect is brought about has not been established. It seems likely that the added ammonia increases the degree of supersaturation of both enantiomorphs, but this would appear to be insufficient to produce the observed result, unless the solubility relationships of the enantiomorphs are also altered, or unless the crystallization of the non-seeded enantiomorph is inhibited or delayed. Whatever the explanation, the presence of excess ammonia permits greater yields of the desired enantiomorph to be attained.

Monoammonium glutamate is unique among the neutral glutamate salts of the alkali metals (the alkali metals being commonly considered to include ammonium) in being susceptible to resolution in the defined manner. The present process is totally inoperative when used in an analogous manner on supersaturated aqueous solutions of, for example, the monosodium and monopotassium D- and L-glutamates.

In carrying out the invention, a supersaturated solution of monoammonium DL-glutamate is prepared in any convenient manner. For example, crystalline DL-glutamic acid can be slurried in water and commingled with a sufficient quantity of ammonia or ammonia solution to produce a pH between about 6 and about 9. The resulting heat of reaction is ordinarily sufficient to effect complete solution of the reactants. The pH of pure monoammonium glutamate lies around 6.5; the use of additional ammonia to raise the pH above this level is believed to decrease the solubility of the monoammonium glutamate and conversely increase the supersaturation of the solution, thereby increasing the potential degree of resolution. However, solutions of excessively high concentration and/or supersaturation tend to crystallize too rapidly and non-selectively, so that the purpose of the process would thereby be defeated. For this reason, it is preferred to carry out the process with a solution initially having a pH between about 7 and about 8.5.

The saturation level of monoammonium L-glutamate monohydrate varies with temperature and pH in the following way:

| Temperature, ° C. | Concentration at Saturation wt.-percent | |
| --- | --- | --- |
| | pH 6.5 | pH 7.5 |
| 21 | 48.5 | 47.8 |
| 25 | 51.2 | 49.5 |
| 30 | 52.1 | 52.7 |
| 35 | 54.4 | 53.8 |

The total concentration of the solution should be such that the desired enantiomorph is present in a concentration from about 10 to about 30% in excess of the saturation level under the existing temperature conditions, preferably between about 15 and about 25%. Concentrations are calculated on the basis of monoammonium glutamate monohydrate.

To the solution thus formed is added a quantity of substantially pure optically active monoammonium glutamate seed crystals, that is, either monoammonium L-glutamate or monoammonium D-glutamate, which are ordinarily obtained in the form of the monohydrate. The seed crystals are preferably employed in the proportion of at least about 5% and optimally between about 10 and about 30% by weight, based on the weight of the desired isomer in the solution. The resulting slurry is agitated gently to assist crystallization, while the temperature is maintained at the desired level by suitable means. The crystallization can be satisfactorily carried out within the temperature range of about 15 to about 35° C., but it is preferred to operate in the range of about 20 to about 30° C., in which range a high degree of resolution is achieved without complications. The degree of resolution ordinarily reaches a maximum in a period of less than about 60 minutes, as may readily be determined by polariscopic observation of the residual liquor. When such maximum is reached, the slurry is promptly filtered, and the crystallized solids are washed and dried. Washing can be carried out with a saturated aqueous solution of the desired monoammonium glutamate enantiomorph, or with methanol, ethanol, or other volatile, water-miscible, oxygen-containing organic solvent. The crystallized solids comprise, in addition to the seed crystals, a substantial proportion of the optically active form of monoammonium glutamate present in the starting solution which corresponds in rotation to that of the seed crystals.

The proportion of seed crystals may vary over a wide range. Some degree of resolution can be obtained with a very small quantity of seed crystals, especially when the crystals are of small size, e.g., as little as 0.5% by weight of 100–200 mesh crystals, based on the weight of the seeded isomer in the solution, provided a sufficient crystallization time is allowed. For any given solution and resolution temperature, however, there is a minimum proportion of seed crystals which will produce the maximum degree of resolution, as shown below in the operating examples. Greater proportions of seed crystals increase the rate of crystallization substantially, but increase the degree of resolution very little. Smaller proportions result in both a slower crystallization rate and a lower degree of resolution. Inasmuch as the non-seeded enantiomorph tends to crystallize after a limited time and to contaminate the seeded enantiomorph, the seed crystals must be employed in a sufficient proportion to produce the desired crystallization within less than such time. For this purpose, it is generally preferred to use at least about 5% by weight of seed crystals, optimally at least about 10%, based on the weight of the corresponding enantiomorph in the solution.

The rate of resolution in the process of the invention is considerably influenced by the size of the seed crystals. In general, the effectiveness of the seed crystals per unit weight increases greatly as the crystal size decreases. Thus, it is reasonable to conclude that the effects of both the size and the amount of the seed crystals are directly related to the total surface area thereof in any given case. It has been observed, for example, that a given amount of finely ground seed crystals having a particle size smaller than 200 mesh (U.S. Standard Sieve Series) produces a faster rate of resolution and also a slightly higher degree of resolution than the same weight of the original unclassified crystals, comprising a mixture of sizes with approximately 70% in the 40 to 60 mesh range.

Preferential crystallization of the optically active salt corresponding to that of the seed crystals will usually begin within about 1 minute after seeding, the crystallization rate varying directly as functions of the pH, the salt concentration, the seed concentration, and the surface area of the seed crystals, and inversely as a function of the crystallization temperature. Spontaneous crystallization of the non-seeded enantiomorph does not begin immediately after seeding, but only after an induction period which normally ranges from about 10 to about 60 minutes. Within this period the degree of resolution of the seeded enantiomorph rises to a maximum, then rapidly drops off as the non-seeded enantiomorph begins to crystallize. It is therefore critically necessary in achieving a high degree of resolution that the crystallization be terminated within such limited period, before any substantial amount of the non-seeded enantiomorph has spontaneously crystallized. It is especially preferred to terminate the crystallization as soon as the degree of resolution levels off, this point being readily determined by measuring the optical activity of the residual solution. The optical rotation of the residual solution changes in the opposite direction to that of the solids, and clearly indicates when crystallization of the seeded enantiomorph has undesirably slowed and spontaneous crystallization of the unseeded enantiomorph is imminent.

The "degree of resolution," as this term is used herein, refers to the proportion of the enantiomorph preferentially crystallized in optically active form from the original solution, based upon the quantity of such enantiomorph originally present therein. The degree of resolution, R, is calculated as a percentage according to the following equation:

$$R = \frac{100(W - 2A - S)}{B}$$

where W is the total weight of the solids obtained in the preferential crystallization, A is the weight of contaminating enantiomorph therein, S is the weight of seed crystals employed, and B is the weight of the seeded enantiomorph in the original solution, all weights being on dry basis.

While water is the preferred crystallization solvent in carrying out the present invention, it may be desirable on occasion to employ a mixed solvent containing up to about 50% by volume, based on the total solvent mixture, of a volatile, water-miscible, oxygen-containing organic solvent such as methanol, ethanol, isopropyl alcohol, acetone, or the like. The organic solvent serves to decrease the solubility of the monoammonium glutamate and to permit somewhat higher resolutions at lower salt concentrations, but occasionally at the expense of lower product purity.

The optically active monoammonium glutamate obtained in accordance with the present invention may conveniently be converted, if desired, into the corresponding monosodium or monopotassium glutamate, or the like, by commingling in aqueous solution with an appropriate base and distilling off the ammonia. For instance, monoammonium L-glutamate can be converted directly into monosodium L-glutamate by reaction in aqueous solution with sodium hydroxide and distilling off the ammonia. The monosodium L-glutamate can be crystallized from the resulting solution in a known manner.

Conversion to monosodium glutamate as described offers an especially convenient method for further purifying the primary product obtained in the invention. At times the primary product may contain a quantity of the undesired isomer. In such case, the product can be reacted with sodium hydroxide in aqueous solution, distilled to drive off ammonia, and concentrated to the saturation level of the monosodium glutamate enantiomorph which is present in excess. At this point the other isomer will crystallize quantitatively in the form of monosodium DL-glutamate dihydrate, leaving a pure solution of the desired enantiomorph. Essentially the same result can be reached by slurrying the primary crystallization product, contaminated with the undesired isomer, with aqueous sodium hydroxide solution, the ratio of primary product to solution being such as to give a substantially saturated solution of the monosodium salt of the predominating isomer, and stripping off the ammonia, whereby the contaminating isomer is converted quantitatively into monosodium DL-glutamate in solid form, leaving a pure solution of the desired enantiomorph.

The preferential crystallization method of the present invention is capable, at best, of resolving only the portion of the seeded enantiomorph which is supersaturated in the starting solution, leaving in every case a considerable quantity of the racemic mixture in the residual solution, together with the non-seeded enantiomorph. For economic reasons, therefore, it is important to employ some means for recovering these glutamic acid values. For this purpose, the following technique has been developed (which for convenience will be described with reference to a process in which monoammonium L-glutamate was the enantiomorph initially seeded and crystallized). From the resulting monoammonium L-glutamate mother liquor is crystallized the supersaturated monoammonium D-glutamate substantially equivalent to the L-isomer previously removed. The remaining solution of racemic monoammonium glutamate is recycled to the beginning of the process. The D-isomer is converted to the racemic form by means well known to the art, and the racemic is recycled to the beginning of the process for additional monoammonium L-glutamate recovery.

Monoammonium DL-glutamate may be prepared as a starting material for the present invention from DL-glutamic acid obtained by any suitable method, such as for example the method disclosed in U.S. Patent 2,606,921 of Weisblat and Lyttle (August 12, 1952).

The invention will be more fully understood from the following operating examples. Except as specified, all of the examples employed unclassified monoammonium L-glutamate monohydrate seed crystals of random size, containing about 50 wt.-percent in the +100 mesh range and about 90% in the +200 mesh range.

Example 1

The following comparative tests illustrate the marked increase in resolution obtained at pH levels above the normal pH (around 6.5) of monoammonium glutamate solutions, employing added ammonia to reach such levels. The tests were carried out generally according to the following procedure.

DL-glutamic acid monohydrate (55.0 grams) was commingled with water (25 milliliters), and aqueous 28% ammonium hydroxide solution (22.5 milliliters, 20.2 grams) was added to reach pH 6.7, the mixture being warmed to effect complete solution. The resulting 61% solution of monoammonium DL-glutamate was cooled to 20° C., seeded with 6.1 grams of pure monoammonium L-glutamate monohydrate crystals, and stirred to promote crystallization. Samples were withdrawn from time to time and analyzed until maximum resolution had been reached.

Tests at higher pH levels were carried out by adding larger quantities of ammonia to the monoammonium glutamate solution, prior to seeding, as required to reach the desired pH levels.

The results were as follows:

| pH | Maximum Resolution, Percent | Time Required, Min. |
|---|---|---|
| 6.7 | 11 | 30 |
| 8.1 | 22 | 30 |
| 9.45 | 26.4 | 15 |

At pH 9.45, the crystallization was very rapid and the product was considerably contaminated with the racemic salt. Thus, at this pH level and at the concentration employed, the maximum effective degree of resolution (i.e., without objectionable contamination of the product) was reached too rapidly for practical use.

Example 2

All efforts to resolve the monopotassium and monosodium salts of DL-glutamate in a parallel manner were unsuccessful.

A. A solution of racemic monosodium glutamate was prepared as follows:

23.2 grams of DL-glutamic acid monohydrate (equivalent to 20.6 grams of anhydrous glutamic acid), $[\alpha]_D = 0.00°$, were slurried in 65.8 ml. of water. To the slurry were added 11.13 grams of a 50% sodium hydroxide solution. The mixture was stirred and warmed to about 40° C. to hasten dissolution of the solids. After the solids were dissolved, the solution was cooled to 26° C. The solution contained 40.1 grams DL-MSG·H$_2$O per 100 grams of water as compared to 25.9 grams of DL-MSG·H$_2$O per 100 grams of water for a saturated solution. Therefore, the solution contained 10.6 grams excess DL-MSG·H$_2$O per 100 grams of water and represented a supersaturation of 35.9%. The solution was pH 6.83.

To the above racemic solution were added 5.0 grams of L-monosodium glutamate monohydrate crystals (equivalent to 3.94 grams of anhydrous glutamic acid), $[\alpha]_D = +25.42°$. On an anhydrous glutamic acid basis the seed crystals were equal to 19.1% of the racemate in solution. The mixture was stirred with moderate agitation. Within 2 minutes all of the L-monosidium glutamate crystals had dissolved. After 3 minutes increasing turbidity was observed in the solution. At the end of 20 minutes the mixture was filtered. The collected crystals were rinsed with 15 ml. of 50% aqueous methanol to displace mother liquor. The following data demonstrates that no resolution was obtained.

Crystals (dry) weight—2.95 grams: $[\alpha]_D = 0.00°$
Filtrate weight—97.4 grams: $[\alpha]_D = +1.299°$ Specific rotation, $[\alpha]_D$, determined in 5% HCl solution.

B. 25 grams of solution containing 17.55 grams DL-MKG·H$_2$O (236 grams DL-MKG·H$_2$O per 100 grams of water) was prepared by dissolving 14.275 grams of DL-GA·H$_2$O in 5.035 grams of water to which 5.69 grams of 85% KOH pellets were added (4.84 grams of KOH). The mixture was heated to effect solution and then cooled to 27° C. The pH of the solution was 7.35. A saturated solution of DL-MKG·H$_2$O contains 205 grams DL-MKG·H$_2$O per 100 grams of water and, therefore, the solution of this test was characterized by a supersaturation of 15%.

To the solution were added 1.75 grams L-MKG·H$_2$O crystals. The mixture was stirred for 30 minutes and then filtered. The solids that crystallized were the unresolved DL-MKG·H$_2$O.

C. 50 grams of solution containing 37.5 grams of DL-MKG·H$_2$O (300 grams DL-MKG·H$_2$O per 100 grams of water) were prepared by dissolving 30.460 grams of DL-GA·H$_2$O in 7.355 grams of water to which had been added 12.185 grams of 85% KOH pellets (10.35 grams of KOH). The mixture was heated to effect solution and then cooled to 27° C. The pH of the solution was 7.88. The initial solution was characterized by a supersaturation of 46%.

To the solution were added 3.75 grams of L-MKG·H$_2$O crystals. The mixture was stirred for 20 minutes and filtered. The crystals formed were unresolved DL-MKG·H$_2$O.

Example 3

The following additional data from the test at pH 8.1 of Example 1 illustrate the change in degree of resolution with crystallization time under the conditions employed. The crystallization mixture contained 61% by weight of dissolved monoammonium DL-glutamate and 20% by weight of monoammonium L-glutamate seed crystals based on the dissolved L-isomer. The crystallization temperature was 20° C.

| Crystallization time, min.: | Resolution, percent |
|---|---|
| 5 | 3.7 |
| 15 | 7.4 |
| 30 | 22.0 |
| 45 | 15.0 |
| 60 | 15.0 |
| 75 | 11.0 |

Example 4

The following additional test, carried out at pH 8.4 and 25° C. but otherwise according to the procedure of Example 1, further illustrates the variation of resolution with crystallization time.

| Crystallization time, min.: | Resolution, percent |
|---|---|
| 10 | 5.0 |
| 20 | 7.4 |
| 30 | 8.3 |
| 50 | 9.4 |
| 70 | 10.9 |
| 95 | 10.9 |

Example 5

Another test was carried out generally as in Example 1, except that the original solution contained 64% by weight of monoammonium DL-glutamate monohydrate and the crystallization was carried out at a solution temperature of 30° C. and a pH of 8.0. The results were as follows:

Crystallization time, min.: Resolution, percent
- 15 — 15.0
- 30 — 16.8
- 45 — 18.7
- 60 — 21.0
- 75 — 21.0
- 90 — 21.0

*Example 6*

The following tests illustrates the way in which the crystallization time and degree of resolution vary with the size and proportion of seed crystals. In each of the test, a 66% solution of monoammonium DL-glutamate monohydrate having a pH of 8 was seeded and allowed to crystallize at 30° C., the procedure being otherwise generally as in Example 1.

With −40 +100 mesh monoammonium L-glutamate monohydrate seed crystals, employed in 20% proportion based on the monoammonium L-glutamate monohydrate in the solution, the resolution reached 22.1% at the end of 120 minutes.

With 20% of −200 mesh seed crystals, the resolution reached a maximum of 24.2% at the end of 68 minutes.

With only 10% of −200 mesh seed crystals, the crystallization required 120 minutes to reach a maximum of 22.6%.

*Example 7*

The following data illustrate the way in which the crystallization time to reach maximum resolution without substantial product contamination varies with the concentration of the monoammonium DL-glutamate in the starting solution. The data are from tests carried out at pH 8 and 25° C. and otherwise generally as in Example 1.

| Initial DL-Salt Concentration, wt.-percent | Time for Maximum Resolution, min. | Maximum Resolution, percent |
|---|---|---|
| 61 | 70 | 10.9 |
| 64 | 50 | 25 |
| 66 | 15–20 | 24 |

*Example 8*

The following table correlates the results of a large group of tests at about pH 8 on the variation of degree of resolution with original concentration of monoammonium DL-glutamate monohydrate at a given temperature, or with temperature at a given concentration:

| Original Conc'n. DL-Salt, percent | Approx. Maximum Resolution, percent | | |
|---|---|---|---|
| | 20° C. | 25° C. | 30° C. |
| 55 | 1.3 | 0.0 | |
| 61 | 17 | 9.0 | |
| 64 | | 25.0 | 21.0 |
| 66 | 25.6 | 24.0 | 23.4 |
| 68 | | | 22.0 |

The specific embodiments of the invention and the particular conditions, materials, and process details set forth herein are submitted only as illustrations, and not by way of limitation. Numerous modifications and equivalents of the invention will be apparent from the foregoing description to those skilled in the art.

The following claims particularly point out and distinctly claim the invention:

1. A process for resolving a mixture of monoammonium glutamate enantiomorphs which comprises preparing an aqueous solution of said enantiomorphs at a supersaturation of at least about 10% and containing ammonia in a proportion at least about 2.5 mole percent greater than a proportion thereof in monoammonium glutamate, seeding said solution with crystals of one of said enantiomorphs, crystallizing solids from the solution at a temperature between about 15 and about 35° C. and at a pH above the natural pH of monoammonium glutamate in aqueous solution, said crystallized solids being initially monoammonium glutamate of optical activity corresponding to the seed crystals, and separating the crystallized solids from the resulting slurry before spontaneous nucleation and crystallization of any substantial proportion of the non-seeded enantiomorph.

2. A process for resolving a mixture of monoammonium glutamate enantiomorphs which comprises preparing an aqueous solution of said enantiomorphs at a supersaturation of at least about 10% and containing ammonia in a proportion greater than the proportion thereof in monoammonium glutamate, seeding said solution with crystals of one of said enantiomorphs, crystallizing solids from the solution at a temperature between about 15 and about 35° C. and at a pH in the range of from about 7 to about 8.5, said crystallized solids being initially monoammonium glutamate of optical activity corresponding to the seed crystals, and separating the crystallized solids from the resulting slurry before spontaneous nucleation and crystallization of any substantial proportion of the non-seeded enantiomorph.

3. A process for resolving a mixture of monoammonium glutamate enantiomorphs which comprises preparing an aqueous solution of said mixture of said enantiomorphs at a supersaturation of at least about 10% and containing ammonia in a proportion between about 2.5 and about 10 mole percent greater than the proportion thereof in monoammonium glutamate, seeding said solution with between about 10 and about 30% by weight of crystals of one of said enantiomorphs, crystallizing solids from the solution at a pH between about 7 and about 8.5 and a temperature between about 15 and about 35° C., said crystallized solids being initially monoammonium glutamate of optical activity corresponding to the seed crystals, and separating the crystallized solids from the resulting slurry within about 1 to about 60 minutes following initiation of crystallization and before spontaneous nucleation and crystallization of any substantial proportion of the non-seeded enantiomorph.

4. A process for resolving monoammonium DL-glutamate which comprises preparing a supersaturated aqueous solution thereof at a supersaturation of at least about 10% containing ammonia in a proportion greater than the proportion of ammonia in monoammonium glutamate, seeding said solution with between about 10 and about 30% by weight of crystals of monoammonium glutamate in one of its optically active forms, crystallizing solids from the solution at a pH between about 7 and about 8.5 and a temperature between about 15 and about 35° C., said crystallized solids being initially monoammonium glutamate of optical activity corresponding to the seed crystals, and separating the crystallized solids from the resulting slurry within about 10 to about 60 minutes following initiation of crystallization and before spontaneous nucleation and crystallization of any substantial proportion of the non-seeded enantiomorph.

References Cited by the Examiner

UNITED STATES PATENTS 2,940,998  6/1960  Ogawa _____ 260—534

FOREIGN PATENTS 543,617  6/1956  Belgium.
2,972–56  4/1956  Japan.

LORRAINE A. WEINBERGER, *Primary Examiner.*

LEON ZITVER, *Examiner.*

D. P. CLARKE, A. P. HALLUIN,
*Assistant Examiners.*